United States Patent [19]

Spengler et al.

[11] Patent Number: 4,849,254

[45] Date of Patent: Jul. 18, 1989

[54] STABILIZING METAL COMPONENTS IN ELECTRODES OF ELECTROCHEMICAL CELLS

[75] Inventors: Charles J. Spengler, Murrysville; Roswell J. Ruka, Churchill Borough, both of Pa.

[73] Assignee: Westinghouse Electric Corp., Pittsburgh, Pa.

[21] Appl. No.: 160,453

[22] Filed: Feb. 25, 1988

[51] Int. Cl.$^4$ .............................................. B05D 5/12
[52] U.S. Cl. ................................. 427/115; 427/376.3; 427/377; 429/41; 429/44; 429/45
[58] Field of Search ..................... 427/115, 376.3, 377; 429/44, 41, 45

[56] References Cited

U.S. PATENT DOCUMENTS

| | | | |
|---|---|---|---|
| 4,344,832 | 8/1982 | Dahlberg | 204/258 |
| 4,348,268 | 9/1982 | Muller | 204/290 |
| 4,422,920 | 12/1983 | Stachwiski et al. | 204/290 |
| 4,490,444 | 12/1984 | Isenberg | 429/31 |
| 4,582,766 | 4/1986 | Isenberg et al. | 429/30 |
| 4,597,170 | 7/1986 | Isenberg | 29/623.5 |
| 4,601,916 | 7/1986 | Arachtingi | 427/97 |
| 4,609,562 | 9/1986 | Isenberg et al. | 427/8 |
| 4,702,971 | 10/1987 | Isenberg | 429/31 |
| 4,748,091 | 5/1988 | Isenberg | 429/31 |
| 4,767,518 | 8/1988 | Maskalick | 429/44 |

OTHER PUBLICATIONS

Accorsi & Bergmann, *Journal of the Electrochemical Society*, vol. 127, No. 4, pp. 805–811, "Cermet Cathodes For High Temperature Water Electrolysis With Zirconia Cells" (Apr. 1980).

*Primary Examiner*—Shrive Beck
*Assistant Examiner*—Vi Duong Dang
*Attorney, Agent, or Firm*—Daniel P. Cillo

[57] ABSTRACT

Disclosed is a method of reducing the removal or transfer into a gas phase of a current carrying metal in an apparatus, such as an electrochemical cell 2 having a porous fuel electrode 6 containing metal particles 11, where the metal is subject to removal or transfer into a gaseous phase, the method characterized in that (1) a metal organic compound that decomposes to form an electronically conducting oxide coating when heated is applied to the metal and porous electrode, and (2) the compound on the metal is then heated to a temperature sufficient to decompose the compound into an oxide coating 13 by increasing the temperature at a rate that is longer than 1 hour between room temperature and 600° C., resulting in at least one continuous layer 13, 14 of the oxide coating on the metal.

16 Claims, 4 Drawing Sheets

4,849,254

STABILIZING METAL COMPONENTS IN ELECTRODES OF ELECTROCHEMICAL CELLS

The Government of the United States of America has rights in this invention pursuant to Contract No. DE-AC21-85MC22046 awarded by the U.S. Department of Energy.

BACKGROUND OF THE INVENTION

A solid oxide fuel cell consists of a solid electrolyte sandwiched between a porous air electrode and a porous fuel electrode. A fuel, such as a mixture of methane and water, is passed over the porous fuel electrode and oxygen is passed over the porous air electrode. Oxygen ions migrate through the electrolyte to the fuel electrode where they react with the fuel, generating heat and electricity.

The porous fuel electrode in one embodiment, is made of nickel particles held in place by an oxygen-ion conducting metal oxide skeletal coating. It has been discovered that, after many hours in operation, the nickel particles in the fuel electrode next to the electrolyte/fuel electrode interface are gradually removed or transferred, resulting in a deterioration of cell performance.

Accorsi and Bergmann, in an article in the *Journal of the Electro Chemical Society,* Volume 127, No. 4, pages 805-811 (April, 1980), observed this phenomenon of metal migration, as seen in their electrolysis experiments. They attempted to eliminate this behavior by alloying the nickel with titanium to reduce diffusion of the nickel. However, they reported that no significant improvement in performance of their electrolysis device occurred.

In another area, Isenberg, in U.S. Pat. No. 4,702,971, and U.S. patent application Ser. No. 072,834, filed on July 13, 1987, now U.S. Pat. No. 4,812,329 in an attempt to improve performance and sulfur tolerance of fuel electrodes of solid oxide fuel cells, coated the nickel particles and zirconia skeleton of the fuel electrode with a complete or partial, thin, single coating of an ionic-electronic material selected from doped or undoped ceria and doped or undoped urania. Coating cracking and flaking occurs with such coatings, however, allowing nickel exposure during fuel cell operation. Such nickel exposure was not seen as a problem in that process, in fact, flaking was seen as adding more active sits to the electrode structure.

SUMMARY OF THE INVENTION

Applicants have discovered that the migration and removal or transfer of the current carrying metal into a gaseous phase in the fuel electrode, in other parts of solid oxide fuel cell generators, and in similar apparatus, is facilitated by reaction with water vapor and can be significantly reduced or even eliminated by applying to the metal particles a compound which can be decomposed to form a water vapor impervious, electronically conducting oxide coating, by heating. Such coating is heated to 600° C. from room temperature over at least a 1 hour time period. This provides a completely continuous oxide coating. A possible explanation for nickel loss in the fuel electrode, may be that volatile nickel compounds form (such as nickel hydroxide, $Ni(OH)_2$), which aid the transfer of nickel from one part of the electrode to another part. By coating nickel particles with a stable, relatively water impervious oxide coating with electronic conductivity, to maintain the electrochemical performance of the electrode, we are able to significantly reduce the removal or transfer of the nickel, and maintain electrochemical performance.

In order to achieve a coating on the nickel particles that is relatively impervious to water vapor at high temperatures, it is necessary that the coating be substantially free from cracks and spalling. We have found that such a coating can be formed by heating thin layers of the compounds used to form the coating, from solution, at a very slow rate of temperature increase between room temperature and 600° C. We have further found that it is preferable to coat the nickel particles at least twice, as subsequent coatings seal any cracks or imperfections that may have formed in the first coatings and provide a completely continuous coating.

In these embodiments of the electrode where the nickel particles are held in a metal oxide skeletal coating which is subject to flaking, the fuel cell can be aged by operation for at least 30 hours, usually at 600° C. to 1000° C., at a current rate that will not oxidize the fuel electrode, so that substantially all flaking will have occurred prior to coating with the oxide.

DESCRIPTION OF THE INVENTION

In order that the invention can be more clearly understood, convenient embodiments thereof will now be described, by way of example, with reference to the accompanying drawings in which:

FIG. 1 is an isometric view in section illustrating a certain presently preferred embodiment of a tubular solid oxide fuel cell according to this invention;

FIG. 2, which best illustrates the invention, is a schematic end view in section showing a certain presently preferred double coated embodiment of a portion of the tubular solid oxide fuel cell of FIG. 1;

FIGS. 3A and 3B are electron scanning micrographs and element maps of a polished metallographic cross-section through an electrode of the presently preferred embodiment that was not coated according to this invention. The electrode in FIG. 3B shows agglomeration of nickel at the surface of the electrode and diminution of the nickel masses near the electrolyte interface; and FIGS. 4A, 4B, 4C and 4D are electron scanning micrographs and element maps which show element distribution of a polished metallographic cross-section through an electrode of the presently preferred embodiment that was coated according to this invention. The electrode in FIG. 4B does not show agglomeration of nickel and dissipation of the zirconia phase at the surface, but shows retention of relatively larger masses of nickel near the electrolyte surface. The element maps of cerium in FIG. 4C and samarium in FIG. 4D, show the thorough distribution of the electronically conducting oxide within the electrode. The Ce-Sm oxide was deposited as described hereinafter.

DESCRIPTION OF THE PREFERRED EMBODIMENTS

Figure 1:
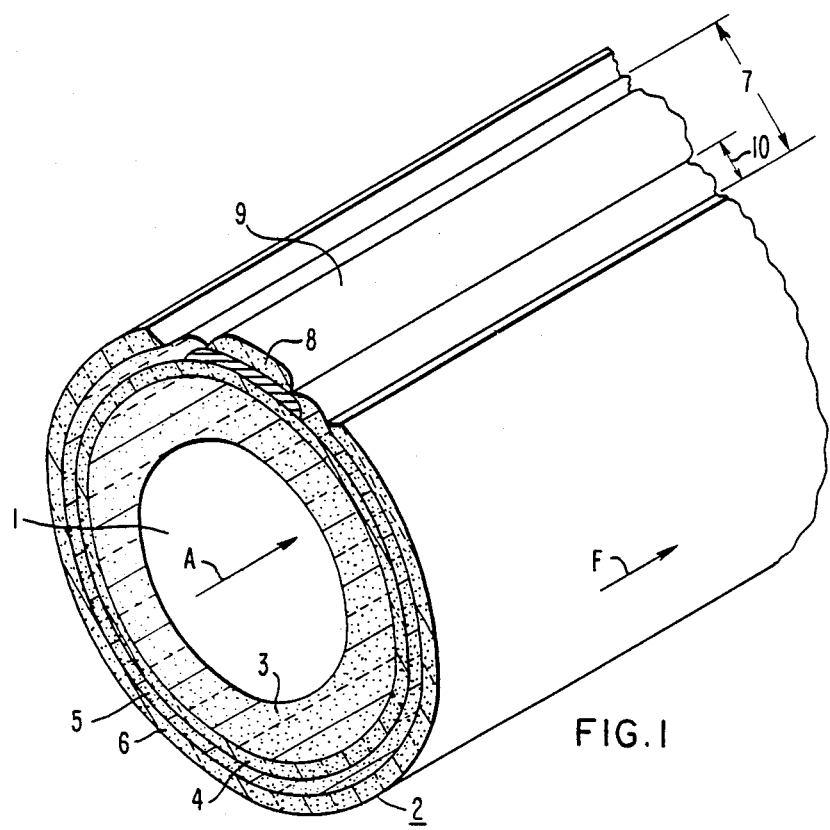

Referring now to FIG. 1, air or oxygen, A, flows through the center 1 of tubular fuel cell 2. The air or oxygen permeates through porous support tube 3 to air electrode 4 where the oxygen is converted to oxygen ions at the air electrode/electrolyte interface. The oxygen ions migrate through electrolyte 5 to fuel electrode anode 6 where they react with the fuel stream, F, to generate electricity. Also shown in FIG. 1 is longitudinal space 7 containing interconnection 8 for making electrical connections between the underlying air electrode 4 and the fuel electrode of an adjacent cell (not shown). An electronically insulating gap 10 electrically separates interconnection 8 from fuel electrode 6. A metal or fuel electrode type of material 9 is coated over interconnection 8. A detailed description of a general operation of a solid oxide fuel cell along with a description of useful support, air electrode, and interconnection materials can be found in U.S. Pat. No. 4,490,444, herein incorporated by reference.

Figure 2:
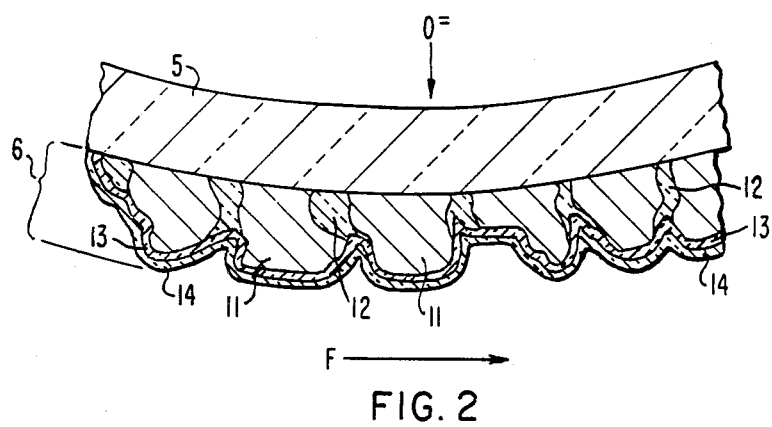

FIG. 2 is a much enlarged and detailed schematic illustration of one embodiment of the structure of fuel electrode 6. In FIG. 2, fuel electrode 6 is formed from metal particles 11, typically of nickel, which are attached to electrolyte 5 by means of a ceramic skeletal material 12. For sake of simplicity, these nickel particles are, shown as large masses, whereas, in fact, they are agglomerations of many small discrete particles with voids therebetween, embedded in the skeletal matrix structure. Dual, water impervious, electronically conductive metal oxide coatings 13 and 14 completely and continuously cover metal particles 11. It is essential to the invention that a continuous coating preferably a series of coatings is provided.

The process of this invention is useful in any type of apparatus where a metal in an electrode can be volatilized by reaction with water vapor or other gaseous species. Such metals include cobalt, iron, platinum, rhodium, and particularly nickel, because it is commonly used as a current collector in solid oxide fuel cells. Examples of such apparatus include solid oxide electrolyzers and fuel cells. The invention is particularly useful in treating fuel electrodes, because in a solid oxide fuel cell they are frequently subject to high water vapor partial pressures. The fuel electrode may be any gaseous-fuel permeable, metal-containing matrix configuration, where the metal is electronically continuous.

Metal oxides that make useful coatings, 13 and 14 in FIG. 2, according to this invention must be stable in fuel atmospheres at the operating temperatures of the apparatus in which they are to be used, and must also form an oxide coating that is impervious to water vapor and that is electronically conductive, so that the coated metal can perform its function as an electronic conductor. In addition to being impervious to water vapor, if the coating is to be used in a solid oxide fuel cell, the coating should also be stable in the presence of one or more of hydrogen, carbon monoxide, carbon dioxide, nitrogen, methane and higher carbon atom hydrocarbons as these gases are or may also be present in the fuel cell.

Examples of suitable coating materials include lanthanum chromite, preferably modified, i e., "doped" by, for example, replacing part of the chromium with magnesium or part of the lanthanum with strontium, calcium, or barium. Strontium titanate can also be used, preferably "doped" with niobium, tantalum, or rare earth elements. These materials, which are excellent electronic conductors are preferred coatings. Cerium oxide can also be used undoped, or "doped" with tantalum, niobium, calcium, strontium, or rare earth elements which replace part of the cerium in the crystal lattice. The amount of dopant used can be up to its solubility limit, which may be up to 10 mole percent or more. The presence of a dopant is preferred because the proper amount of the right dopant can enhance the conductivity, stabilize the crystal structure, and help match coefficients of thermal expansion to prevent cracking.

The oxide coatings, 13 and 14 in FIG. 2, can be formed in a variety of ways. For example, in coating the particles on a fuel electrode after the fuel electrode has been formed, a solution in water and/or organic solvent of a soluble metal organic compound, such as an acetate of the element that will form the desired oxide in the coating upon appropriate heat treatment, is applied to the metal particles in the fuel electrode. Organic anions such as acetate or propionate are preferred. Inorganic anions, such as nitrate can be used if organic anion is also present. Use of organic anions has proven to provide better coating coverage.

When the coating solution has dried, it is heated to about 600° C. in a partially reducing atmosphere. By "partially reducing" is meant, containing a small volume of $H_2$, such as 84 vol.% $N_2$, 11 vol.% $H_2O$ and 5 vol.% $H_2$. This is sufficiently reducing to be effective to maintain Ni or Co in the metallic state, but oxidizing enough to decompose the metal organic to form the corresponding metal oxide. The coating is then cooled to room temperature. It is preferable to apply a second or even a third coating over the first coating to seal any cracks or flaws that may have formed in the first coating on the nickel particles. The same or a different composition may be used to form the second coating. In forming the coating by this process, it is very important to heat at a slowly increasing temperature, preferably at a uniform rate, between room temperature and about 600° C., allowing, for example one or preferably two hours or more for that temperature increase to occur. This produces a very slow decomposition of the organic component, which reduces or prevents spalling or cracking of the oxide film coating.

Other methods by which the coating may be formed include the electrophoretic deposition of particles suspended in a solution followed by their subsequent slow heating, as before, to form the oxide coating. The electrophoretic method has the advantage of preferentially coating those areas that are most conductive, i.e., the exposed metal. By whatever method the coating is formed, the amount of material used in forming the coating should be selected so that about 2 $mg/cm^2$ to about 5 $mg/cm^2$ of the top surface of the fuel electrode (or of the article being coated), are covered with the oxide coating.

Where the nickel particles are held in place by a metal oxide skeleton, usually of the same composition as the electrolyte, which coating is subject to flaking during electrochemical cell operation, the cell can be aged prior to coating application. In this instance the cell is operated for at least 30 hours, usually 30 hours to 60 hours, usually at 600° C. to 1000° C. This additional step allows substantially all skeletal flaking or cracking and metal exposure to occur prior to the previously described coating operation. This can be very important to maintaining complete film coating of the exposed metal component of the fuel electrode structure. The electronically conducting coating where present on the oxygen conducting phase of the electrode will crack and spall due to water formation at the interface between the oxides. Water will form when hydrogen permeates the electronically conducting oxide and reacts with oxygen ions.

The following example further illustrate this invention.

EXAMPLE

Fuel cell tubes were prepared as shown in FIGS. 1 and 2 using a fuel electrode made of powdered nickel particles held in place by a yttria stabilized zirconia skeleton. The fuel electrode of one fuel cell tube was left untreated, and the fuel electrode of a second cell, which was aged for about 50 hours by operation at 900° C. to 1000° C., was treated according to this invention. A solution was made, containing 0.0154 mole of cerium acetate, 0.0046 mole of samaria, and 0.010 mole nickel acetate, in 20 grams of $H_2O$. The solution was brushed over the fuel electrode and the fuel cell was heated. The heating time between room temperature and 600° C. was about 6 hours. The fuel cell was cooled to room temperature and repainted with additional solution. The tube was again heated to the same temperature for the same time. The fuel cells were, placed in use for 400 hours at 1000° C. using a fuel of 22 percent by volume of carbon monoxide, 67 percent by volume hydrogen, and 11 percent by volume of water vapor. Metallographic cross-sections through the fuel electrode and electrolyte where made for each fuel cell.

Figure 3A:
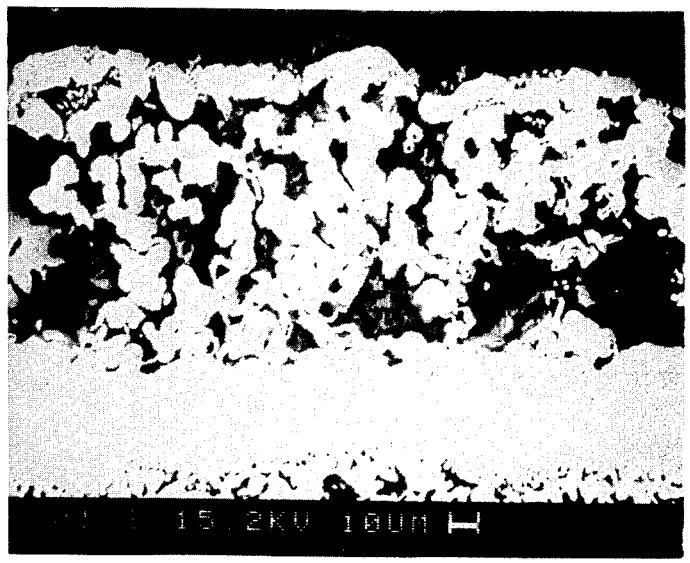
Figure 3B:
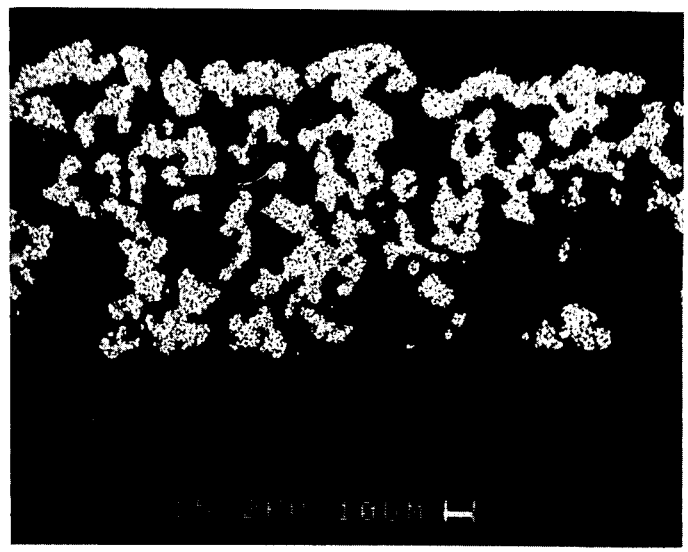
Figure 4A:
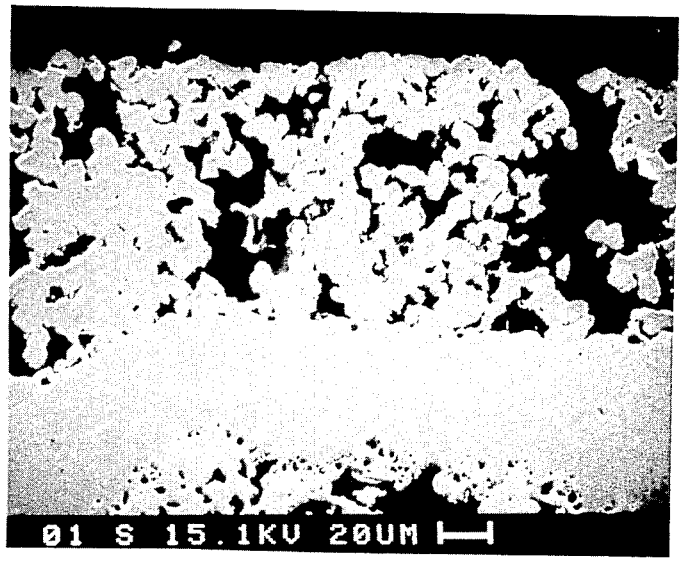
Figure 4B:
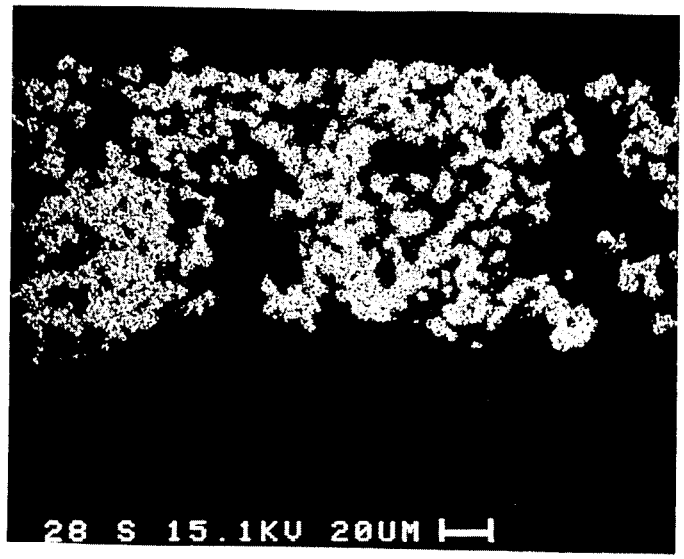
Figure 4C:
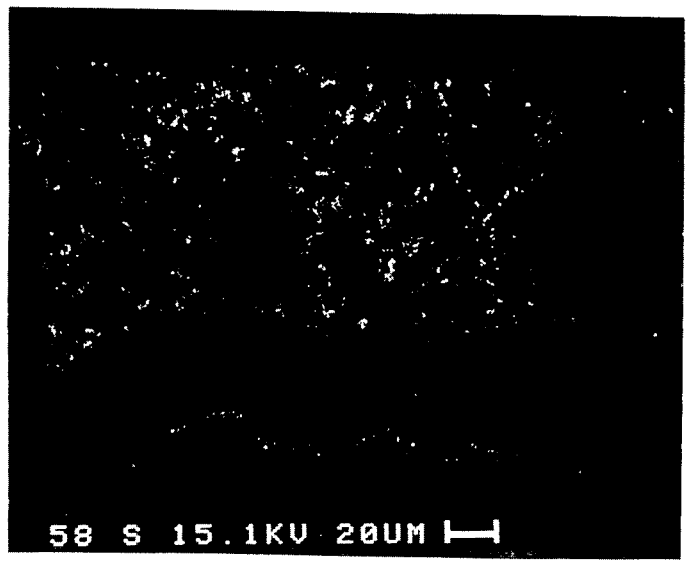
Figure 4D:

FIG. 3A shows a back scattered electron scanning micrograph of an untreated electrode. FIG. 3B is an element map of nickel distribution in the untreated electrode. FIG. 4A shows a back scattered electron scanning micrograph of an electrode coated initially with a cerium samarium acetate solution according to this invention. FIG. 4B is an element map of nickel distribution in the treated electrode. As can be seen, after substantial use in fuel at 1000° C., a much larger part of the nickel (light particles) remains near the surface of the electrolyte (back dark area) in FIG. 4B as compared to FIG. 3B. FIG. 4C is an element map of cerium (light particles) and FIG. 4D is an element map of samarium (light particles), both showing excellent distribution of these coating elements through the top fuel electrode layer.

We claim:

1. In an apparatus where a current carrying metal is subject to transfer into a gaseous phase, a method of reducing said transfer comprising the steps: (1) applying to said metal a solution comprising metal organic compound selected from the group consisting of metal acetates, and metal acetates mixed with metal nitrates, which forms a water vapor impervious, electronically conducting oxide coating when heated, and (2) heating said solution in a partially reducing atmosphere, to a temperature effective to convert said compound to a vapor impervious, electronically conducting oxide coating, at a rate of temperature increase longer than 1 hour between room temperature and 600° C., whereby said metal subject to transfer remains in the metallic state and is completely covered with a continuous layer of electronically conducting oxide coating selected from the group consisting of an oxide coating containing lanthanum chromite, an oxide coating containing strontium titanate, and an oxide coating containing cerium oxide.

2. A method according to claim 1, wherein the metal subject to transfer is selected from the group consisting of iron, cobalt, platinum, rhodium, nickel, and mixtures and alloys thereof, and the deposit of the continuous conducting oxide layer is from about 2 $mg/cm^2$ to about 5 $mg/cm^2$.

3. A method according to claim 2, wherein the metal subject to transfer is nickel.

4. A method according to claim 1, wherein the metal subject to transfer is nickel particles in the fuel electrode of a solid oxide electrochemical cell, and where the fuel electrode can have any configuration that is both electronically conducting and permeable by gaseous fuel species.

5. A method according to claim 1, wherein the oxide coating contains lanthanum chromite doped with magnesium, strontium, calcium, or barium.

6. A method according to claim 1, wherein the oxide coating contains strontium titanate doped with niobium, tantalum, or rare earth elements.

7. A method according to claim 1, wherein the oxide coating contains cerium oxide doped with tantalum, niobium, calcium, strontium, or rare earth elements.

8. A method according to claim 1, wherein the oxide coating is water vapor impervious and stable in hot fuel mixtures containing one or more of water vapor, hydrogen, carbon monoxide, carbon dioxide, nitrogen, methane, and higher hydrocarbons, and steps (1) and (2) are repeated, to provide at least two continuous oxide layers on the metal.

9. A method according to claim 1, wherein the oxide forming compound is applied to the metal electrophoretically.

10. In a solid oxide fuel cell having a porous fuel electrode that comprises nickel particles subject to transfer into a gaseous phase, embedded in a ceramic skeleton material, a method of reducing said transfer comprising the steps:

(A) applying to said porous fuel electrode a solution comprising metal organic compound selected from the group consisting of metal acetates, and metal acetates mixed with metal nitrates that, when heated, forms a water vapor impervious, electronically conducting oxide coating; and (B) slowly heating said fuel electrode and applied solution in a partially reducing atmosphere, to evaporate solvent, decompose the organic compound, and form a continuous, water impervious layer of electronically conducting oxide selected from the group consisting of an oxide coating containing lanthanum chromite, an oxide coating containing strontium titanate, and an oxide coating containing cerium oxide, completely covering the exposed nickel particles of said fuel electrode, which nickel particles remain in the metallic state, where the heating is at a rate of longer than 1 hour from room temperature to 600° C.

11. A method according to claim 10, wherein steps (A) and (B) are repeated to form at least two layers of said coating on the exposed nickel particles of the fuel electrode.

12. A method according to claim 10, where before step (A) the fuel cell is operated for at least 30 hours at from 600° C. to 1000° C. to allow aging of the ceramic skeleton material, exposing nickel particles, and where the deposit of the continuous conducting oxide layer is from about 2 $mg/cm^2$ to about 5 $mg/cm^2$.

13. A method according to claim 10, wherein the oxide coating contains lanthanum chromite doped with magnesium, strontium, calcium, or barium.

14. A method according to claim 10, wherein the oxide coating contains strontium titanate doped with niobium, tantalum, or rare earth elements.

15. A method according to claim 10, wherein the oxide coating contains cerium oxide doped with tantalum, iobium, calcium, strontium, or rare earth elements.

16. A method according to claim 10, wherein the oxide coating is stable in hot fuel mixtures containing one or more of water vapor, hydrogen, carbon monoxide, carbon dioxide, nitrogen, methane, and higher hydrocarbons.

* * * * *